United States Patent [19]

Dobyns et al.

[11] 4,298,979
[45] Nov. 3, 1981

[54] DECODING TIM BUS STRUCTURE

[75] Inventors: Thomas R. Dobyns, Frederick; Richard R. Lindstrom, Brunswick; Robert P. Ridings, Walkersville, all of Md.

[73] Assignee: Communications Satellite Corporation, Washington, D.C.

[21] Appl. No.: 79,655

[22] Filed: Sep. 27, 1979

[51] Int. Cl.³ .............................................. H04J 3/06
[52] U.S. Cl. ...................................... 370/104; 370/80
[58] Field of Search .................... 370/104, 80, 79, 95, 370/112, 113, 60, 94, 82, 83, 84

[56] References Cited

U.S. PATENT DOCUMENTS

| | | | |
|---|---|---|---|
| 3,632,882 | 1/1972 | Ciecierski | 370/83 |
| 3,806,879 | 4/1974 | Schmidt | 370/104 |
| 3,927,268 | 12/1975 | Sciulli | 370/80 |
| 3,988,545 | 10/1976 | Kuemmerle | 370/83 |
| 4,048,447 | 9/1977 | Marnta | 370/81 |
| 4,205,200 | 5/1980 | Parikh | 370/83 |

*Primary Examiner*—David L. Stewart

*Attorney, Agent, or Firm*—Sughrue, Mion, Zinn, Macpeak & Seas

[57] ABSTRACT

A multiplexing/demultiplexing bus structure for a TDMA communications system employs a mapping RAM in common equipment and a decoding device in a plurality of interface modules. The common equipment provides identical encoded information to each of the decoders in the interface modules, the decoders in each of the interface modules determining whether or not incoming or outgoing data is to be written into or read from the associated interface module. The decoders initiate a count to provide an address for the data written into or read out of a buffer in the associated interface module. The common equipment can thereby provide burst-to-burst selection of data. Burst and/or channel allocation may be changed in real time for any of the interface modules through a "demand assignment" process. A central network controller receives all capacity and destination requests for processing. The controller can then send capacity and destination assignments to network stations where they are received and decoded. The mapping functions of the appropriate RAMs are updated in accordance with the central network controller's instructions.

8 Claims, 34 Drawing Figures

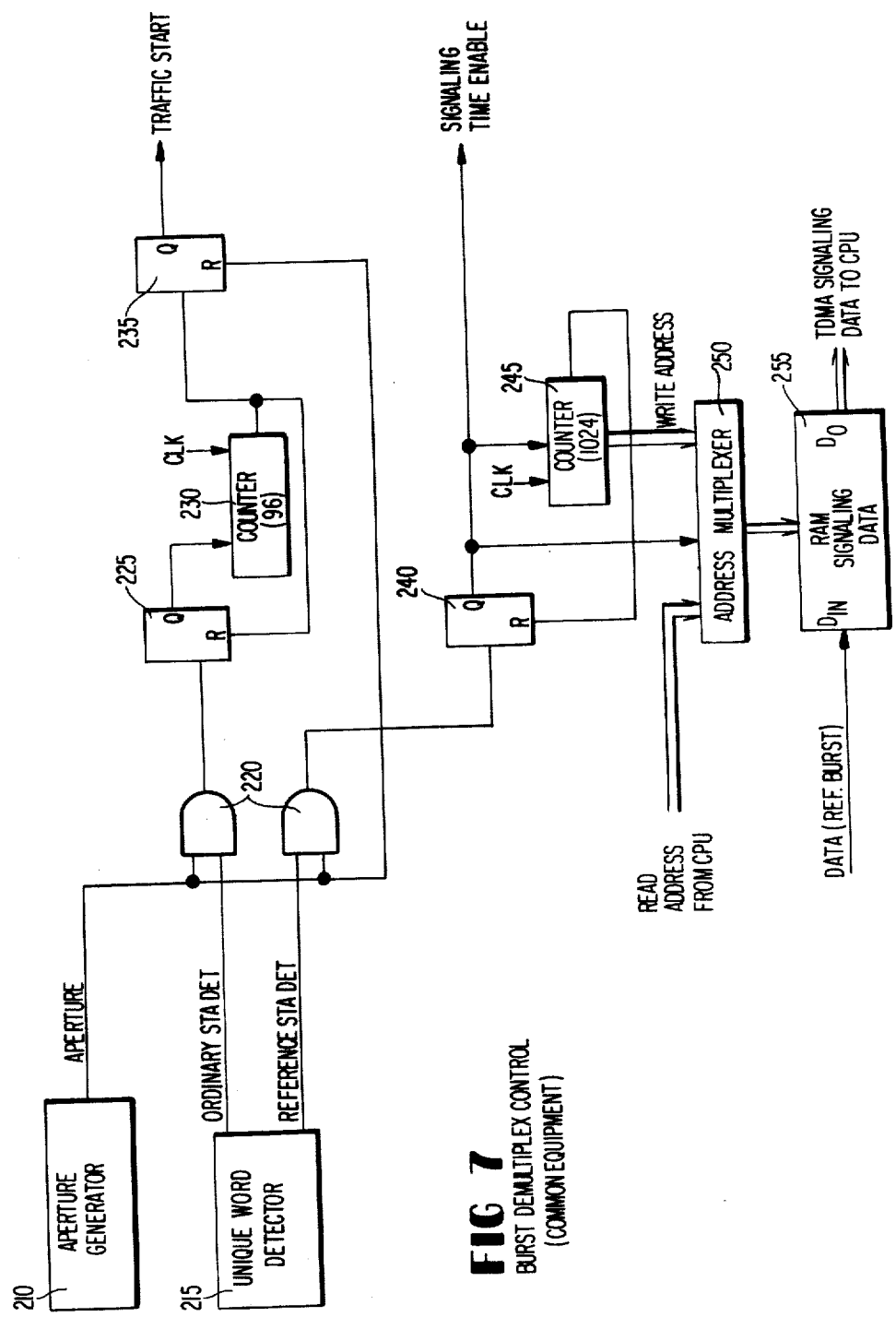
FIG. 7 BURST DEMULTIPLEX CONTROL (COMMON EQUIPMENT)

FIG 8 RECEIVE CONTROL PROCESSOR FLOW DIAGRAM
FIG 9 RECEIVE CONTROL PROCESSOR FLOW DIAGRAM
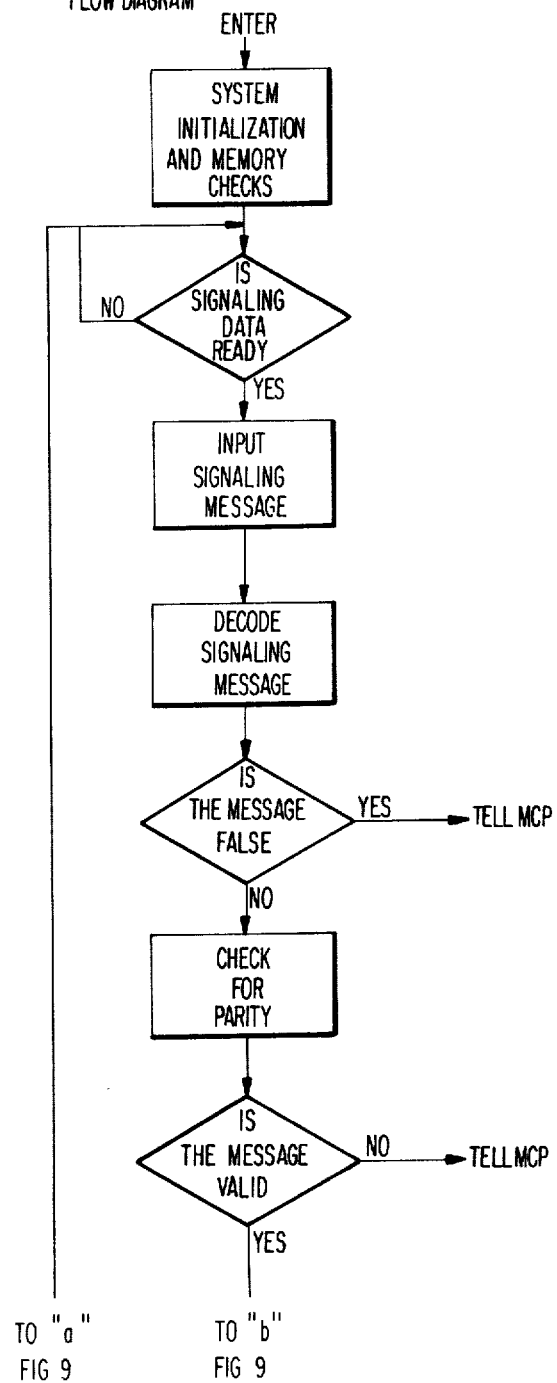
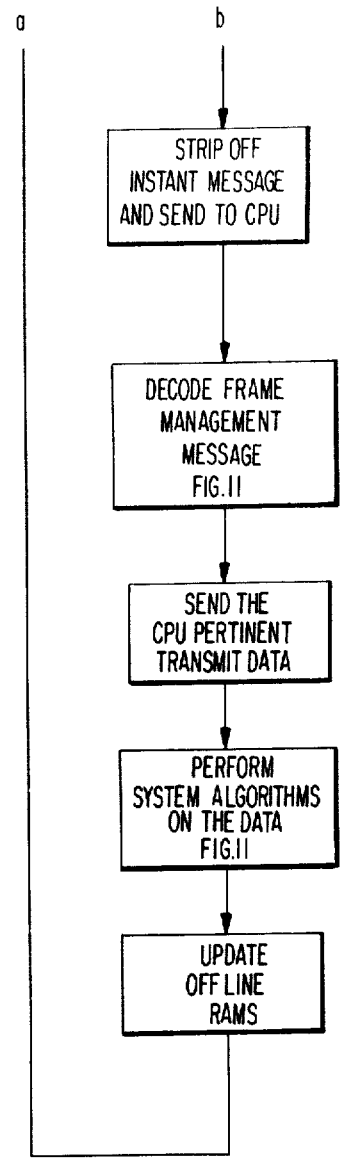

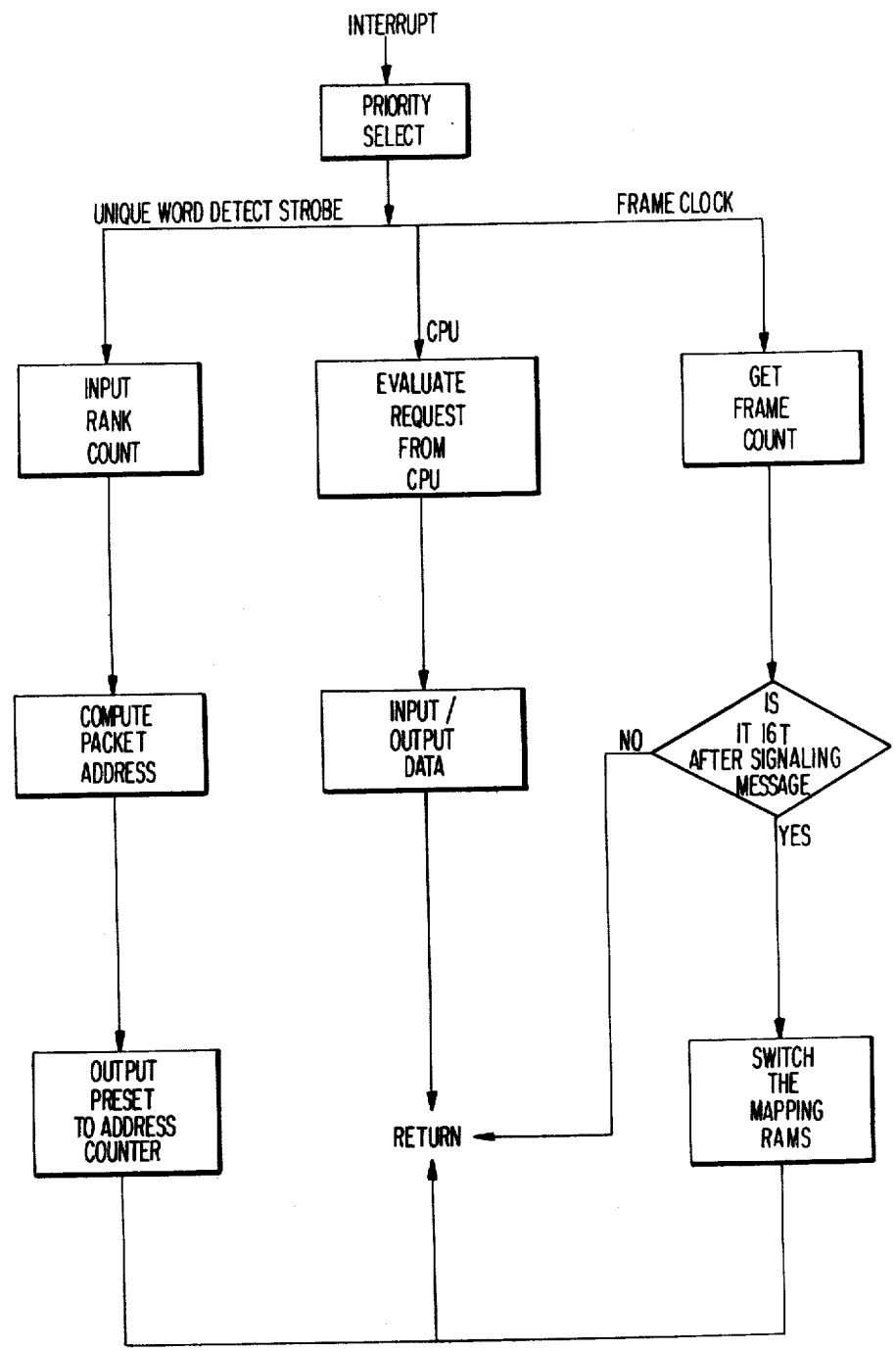
FIG 10   INTERRUPT CONTROL CPU

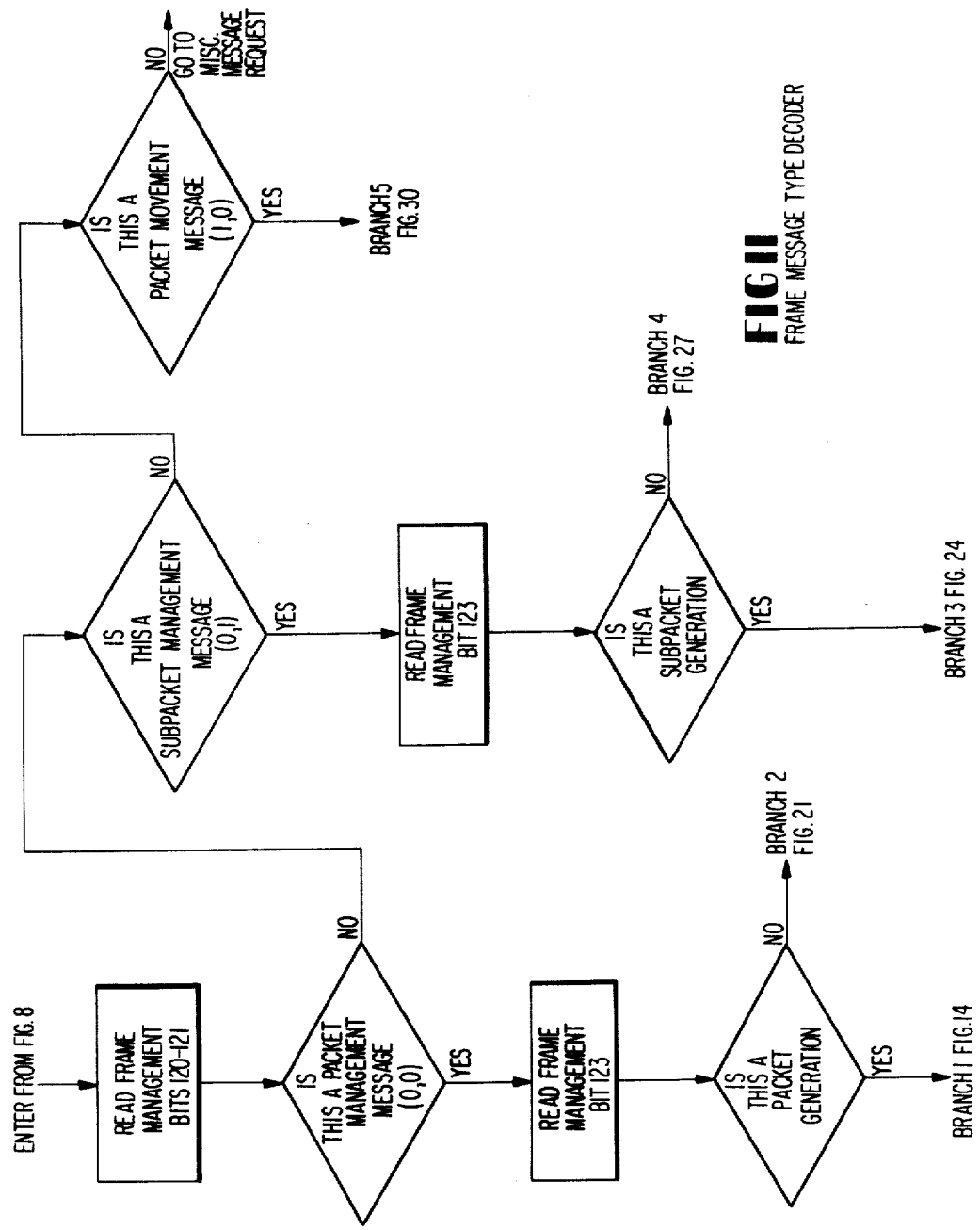

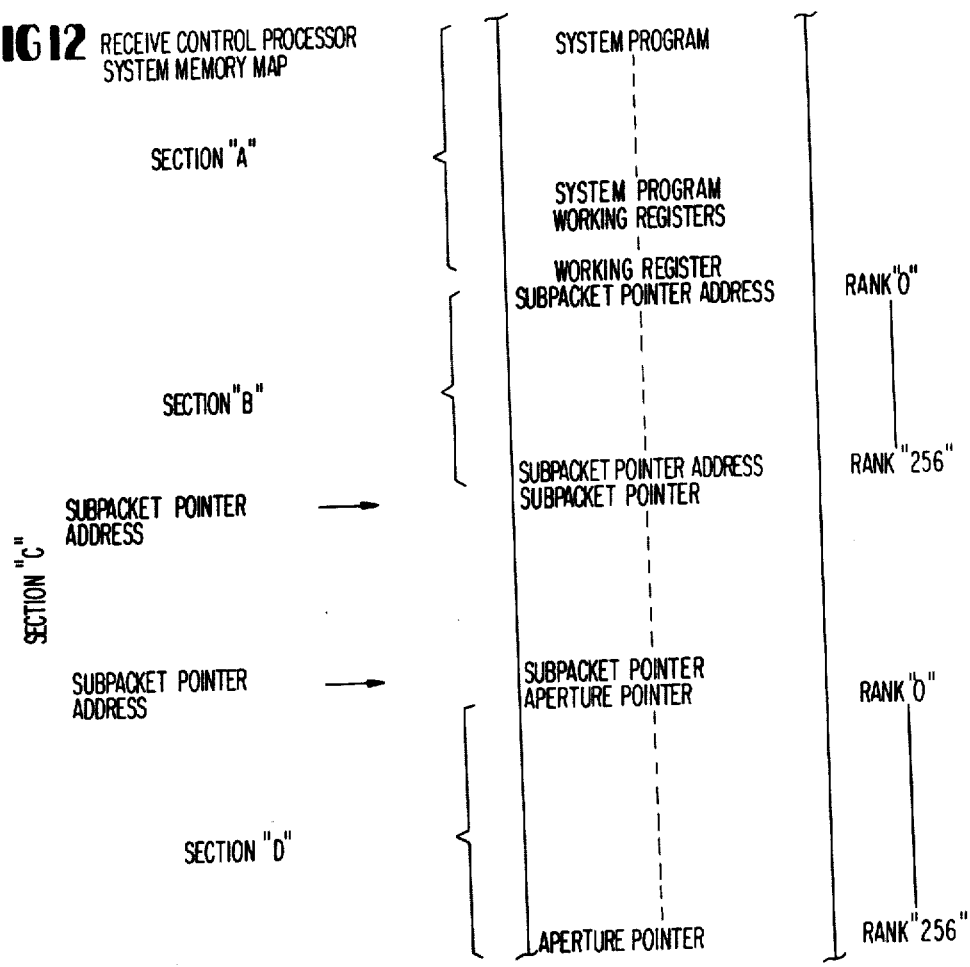
FIG 12 RECEIVE CONTROL PROCESSOR SYSTEM MEMORY MAP
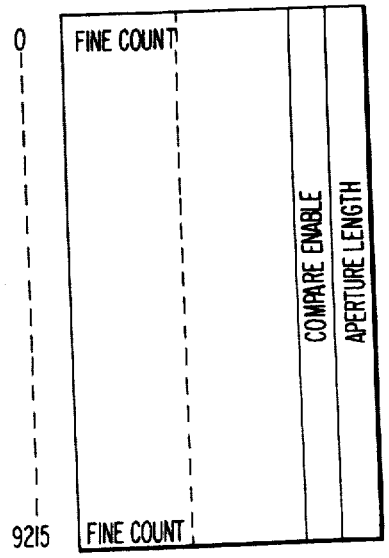
FIG 13 APERTURE MEMORY MAP

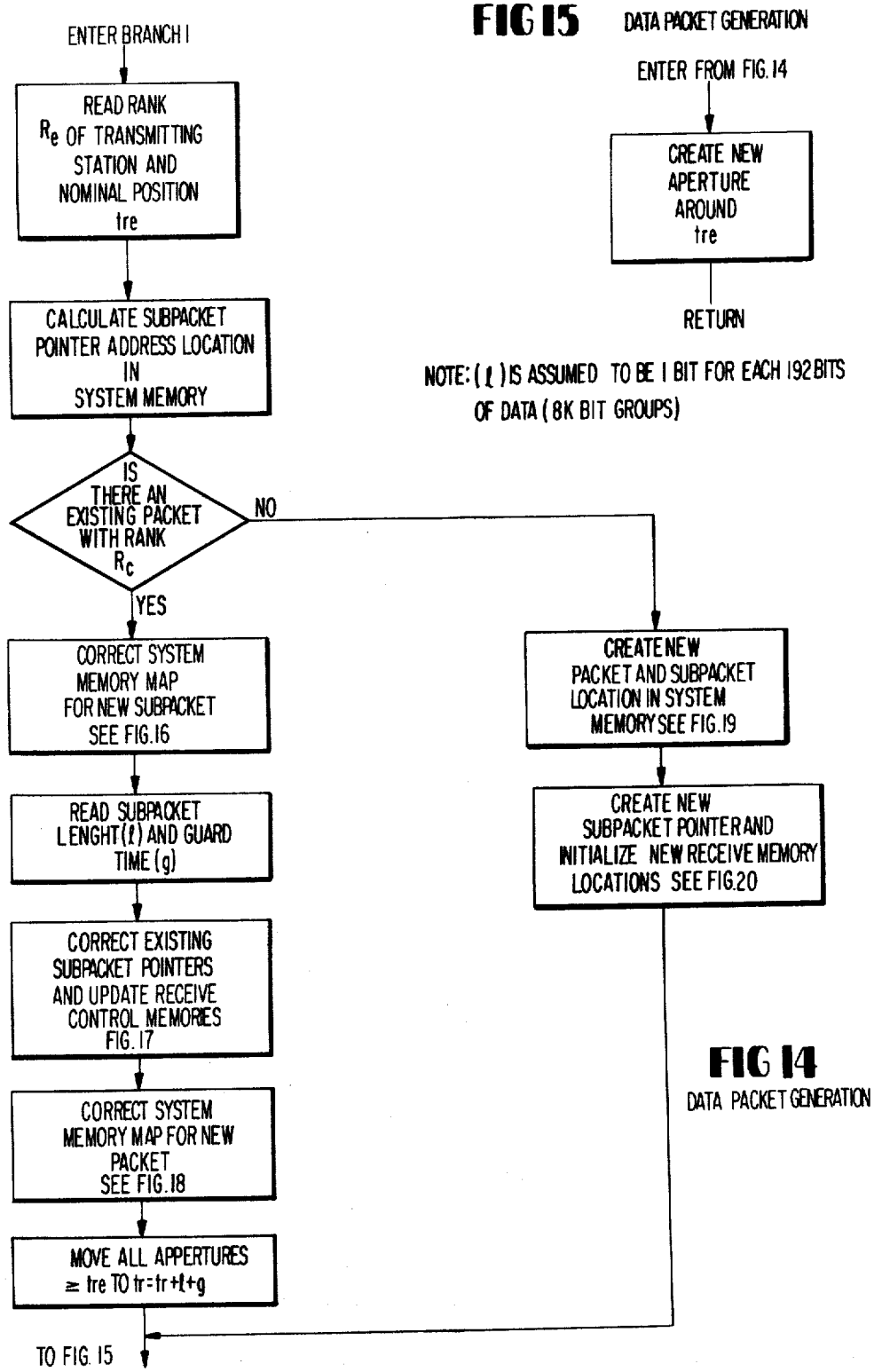

UPDATE SYSTEM MEMORY FOR ADDED SUBPACKET

UPDATES SUBPACKET POINTERS AND RECEIVE CONTROL MEMORY

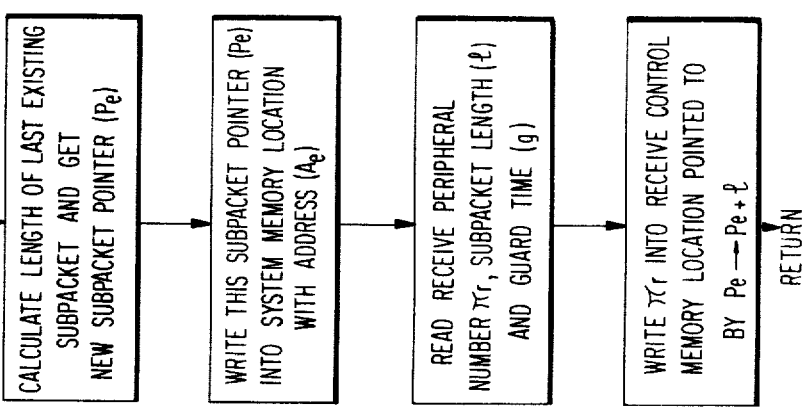
FIG. 20 CREATES NEW SUBPACKET POINTER AND INITIALIZES CORRESPONDING RECEIVE CONTROL MEMORY.
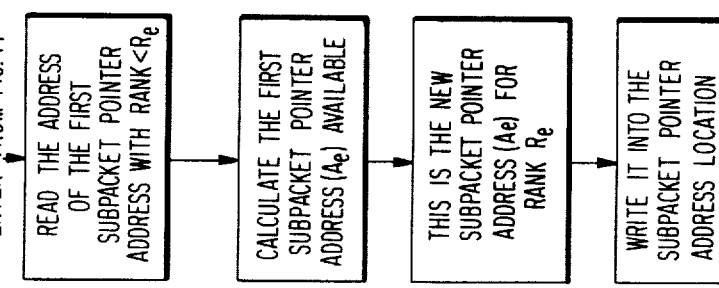
FIG. 19 CREATES NEW PACKET AND SUBPACKET LOCATIONS.
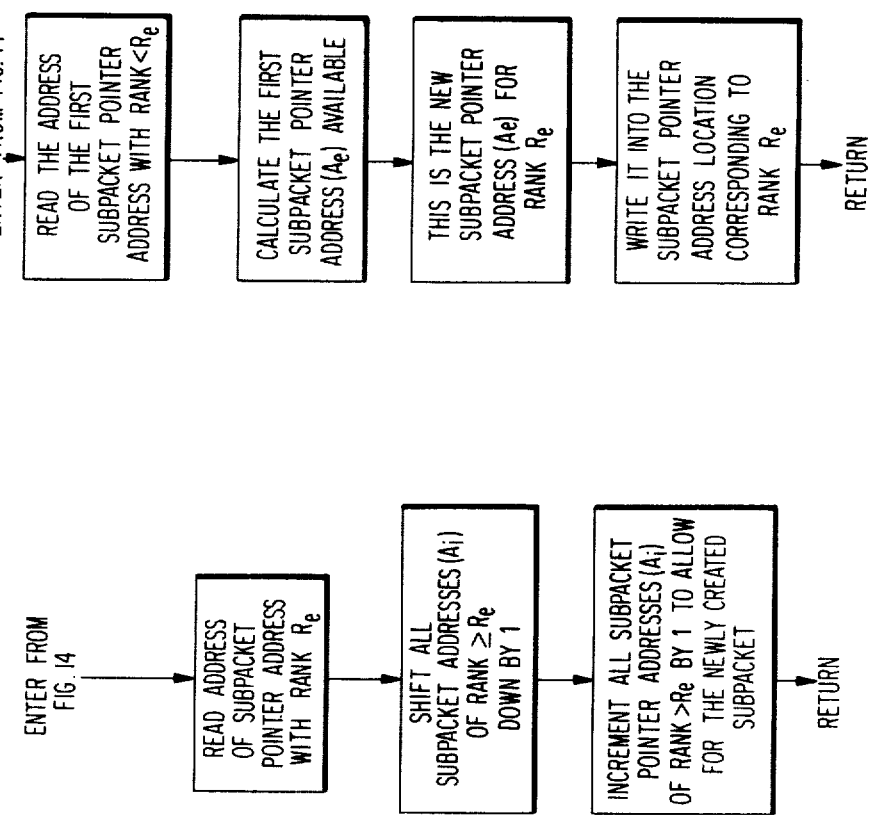
FIG. 18 REVISES SYSTEM MEMORY MAP TO ACCOMMODATE NEW PACKET.

DATA PACKET DELETION

UPDATES RECEIVE CONTROL MEMORY FOR DELETION OF PACKET

FIG 23 REVISES SYSTEM MEMORY MAP TO DELETE PACKET ADDRESS AND SUBPACKET POINTER

FIG 24 SUBPACKET GENERATION
FIG 25 UPDATE SUBPACKET LOCATIONS FOR NEW SUBPACKET GENERATION
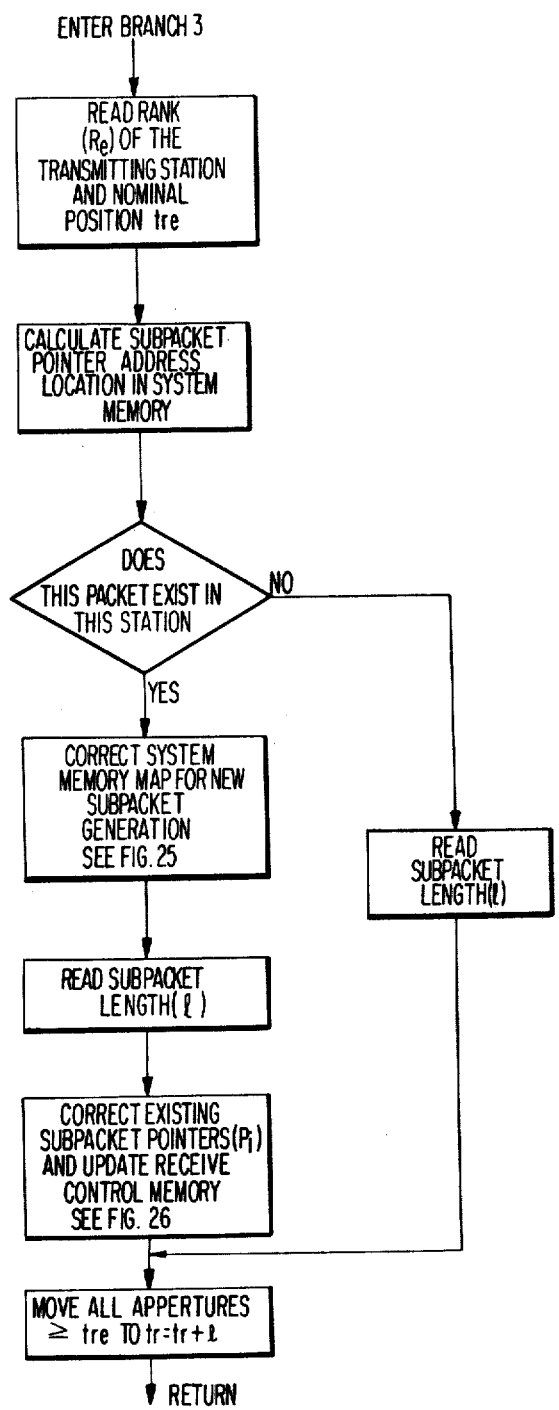
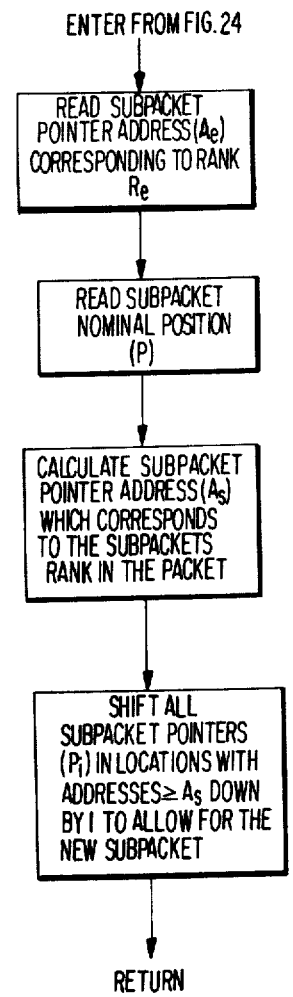

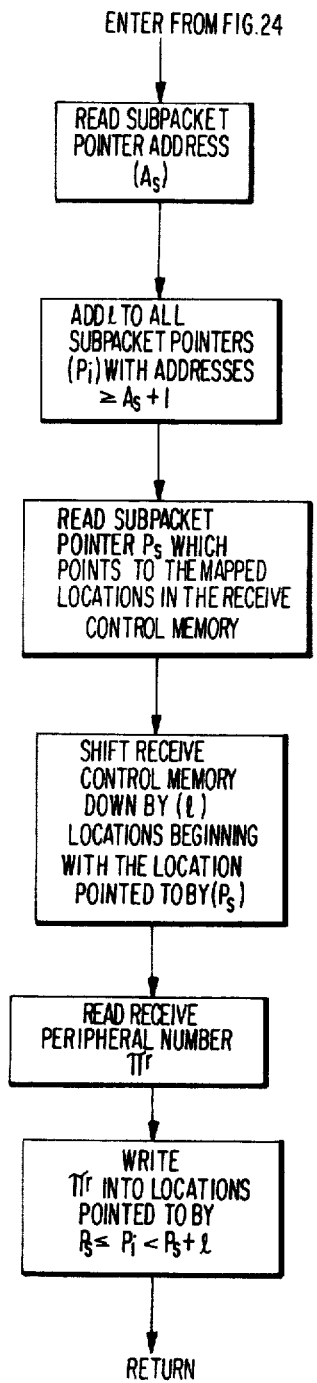
FIG 26 UPDATES SUBPACKET POINTERS AND RECEIVE CONTROL MEMORY FOR SUBPACKET GENERATION
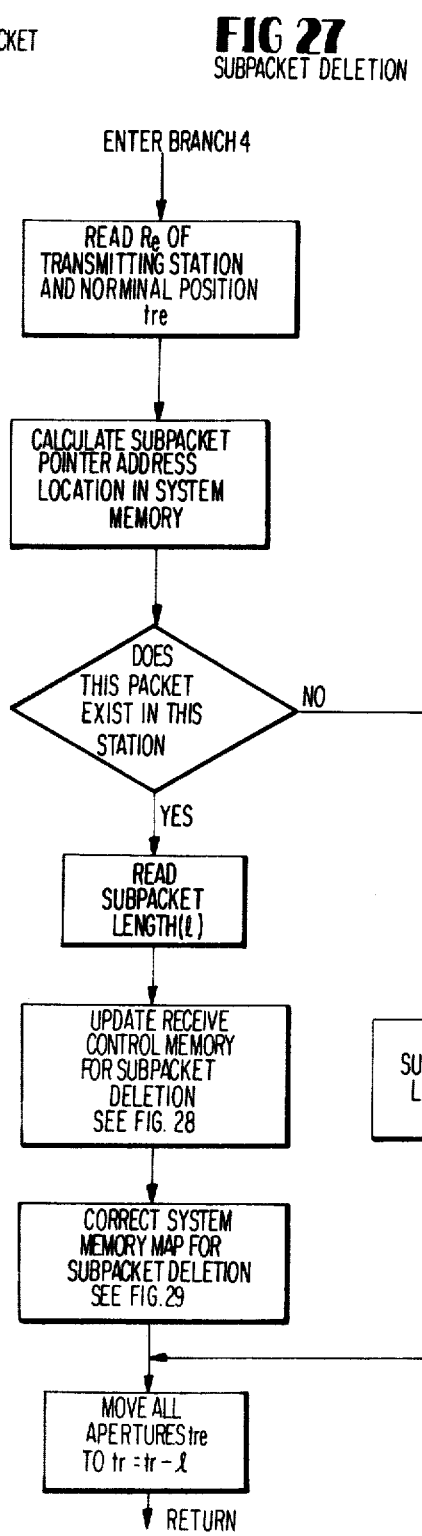
FIG 27 SUBPACKET DELETION

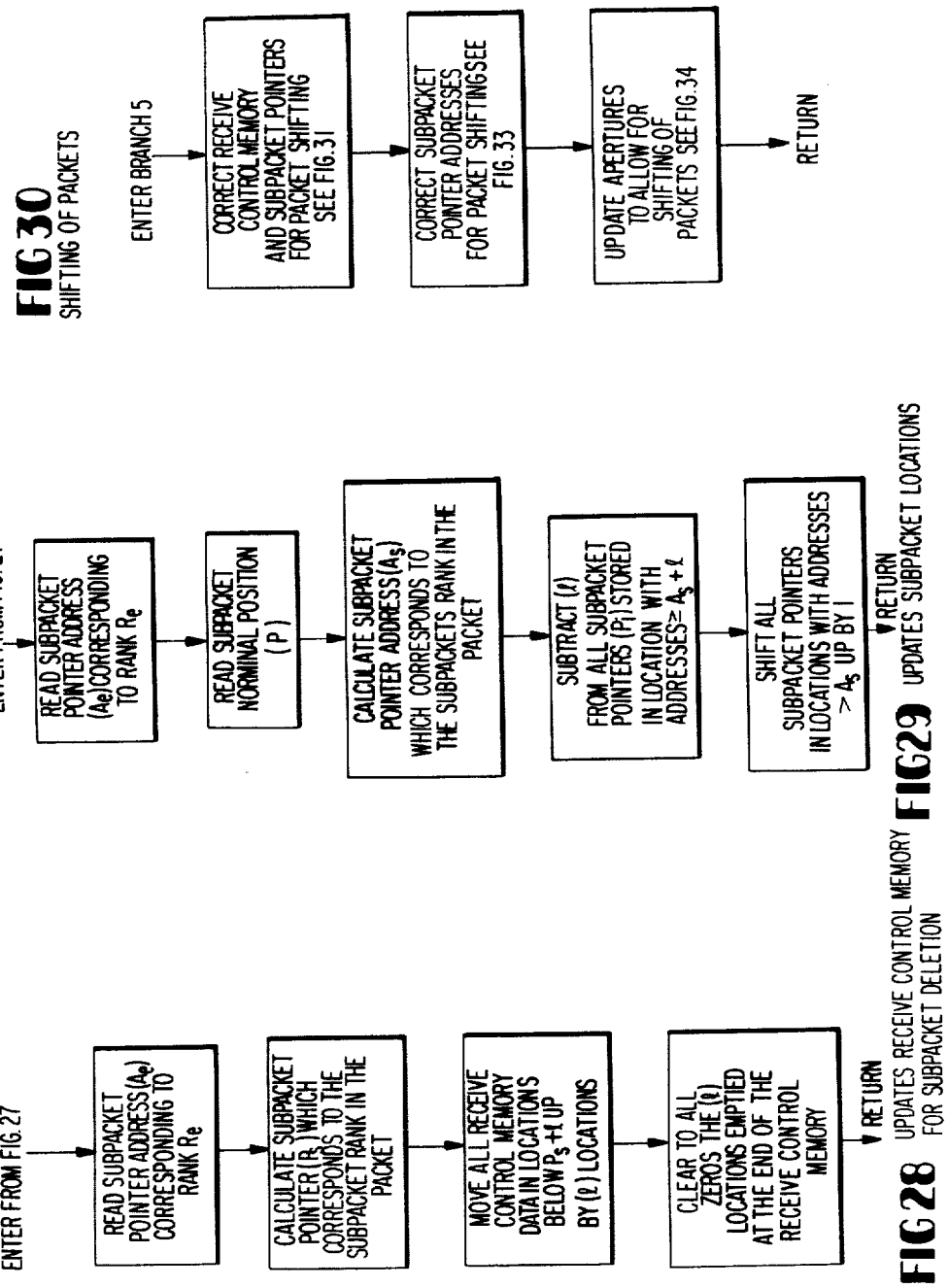

RECEIVE CONTROL MEMORY AND SUBPACKET POINTER UPDATE FOR PACKET SHIFTING

SUBPACKET POINTER ADDRESS MANIPULATION
FOR PACKET SHIFTING

APERTURE CORRECTION FOR PACKET

DECODING TIM BUS STRUCTURE

FIELD OF THE INVENTION

The invention relates to the field of satellite communications and to computer controlled data allocation amoung a plurality of users in a time multiplexed environment.

The invention herein disclosed finds particular utility when employed in conjunction with satellite communication apparatus and techniques generally disclosed in the following commonly assigned, co-pending, concurrently filed U.S. Patent applications, the disclosures of which are hereby incorporated by reference:
1. "TDM Data Reorganization Apparatus", by Warner, Ser. No. 79,601.
2. "TIM Bus Structure", by Gupta, Warner and Deal, Ser. No. 79,602.
3. "Microprogrammable TDMA Terminal Controller", by Deal, Ser. No. 79,619.
4. "Interleaved TDMA Terrestrial Interface Buffers", by Deal, Ser. No. 79,681.
5. "Digital Phase Lock Loop for TIM Frequency Using Frequency Synthesis Technique", by Gupta, Ser. No. 79.671.
6. "A High Resolution Frequency Synthesizer", by Gupta, Ser. No. 79,603.

BACKGROUND OF THE INVENTION

The ground stations of satellite communications systems generally involve a plurality of users attached to the ground station transmitter through common equipment. In prior art systems the plurality of users or "interface modules" were multiplexed and demultiplexed to and from the common equipment generally by employing well-known multiplexers and demultiplexers. The bus structures involved in the multiplexing/demultiplexing operations were configured in a variety of ways such as the radial, party-line (bus), or daisy chain configurations. These prior art tenchiques are generally large in size and inflexible in nature. That is, the channel allocation for each burst of data for each of the interface modules must be preset by the multiplexer/demultiplexer and changes in channel and/or burst allocation (assignment) for any one of the interfaced modules requires a substantial reorganization of the multiplex/demultiplex operation.

SUMMARY OF THE INVENTION

The subject invention provides a unique multiplexing/demultiplexing bus structure which employs a mapping RAM in the common equipment and a decoding device in the interface module. The common equipment provides identical encoded information to each of the decoders in the interface modules. The decoders in each interface module determine whether incoming or outgoing data is respectively written into or read from the associated interface module, and initiate a count to provide and address for the data which is written into or read from a buffer in the interface module. The common equipment allows for burst-to-burst selection of data and presets the address provided to the mapping RAM for each burst.

The subject invention further provides a technique of performing changes in channel and/or burst allocation in real time for any of the interface modules. This "demand assignment" feature employs a centralized demand assignment system whereby all capacity and destination requests are sent to a central network controller. After processing destination and reception requests, the controller sends capacity and destination assignments to network stations where they are received and decoded. The mapping functions of the appropriate RAMs are updated in accordance with the central network controller's instructions.

BRIEF DESCRIPTION OF THE DRAWINGS

FIG. 7 is a schematic illustration of burst demultiplex control.

FIGS. 8–34 are flow charts illustrating the preferred technique of updating capacity and destination requests at the central network controller.

DETAILED DESCRIPTION OF THE INVENTION

Figure 1:
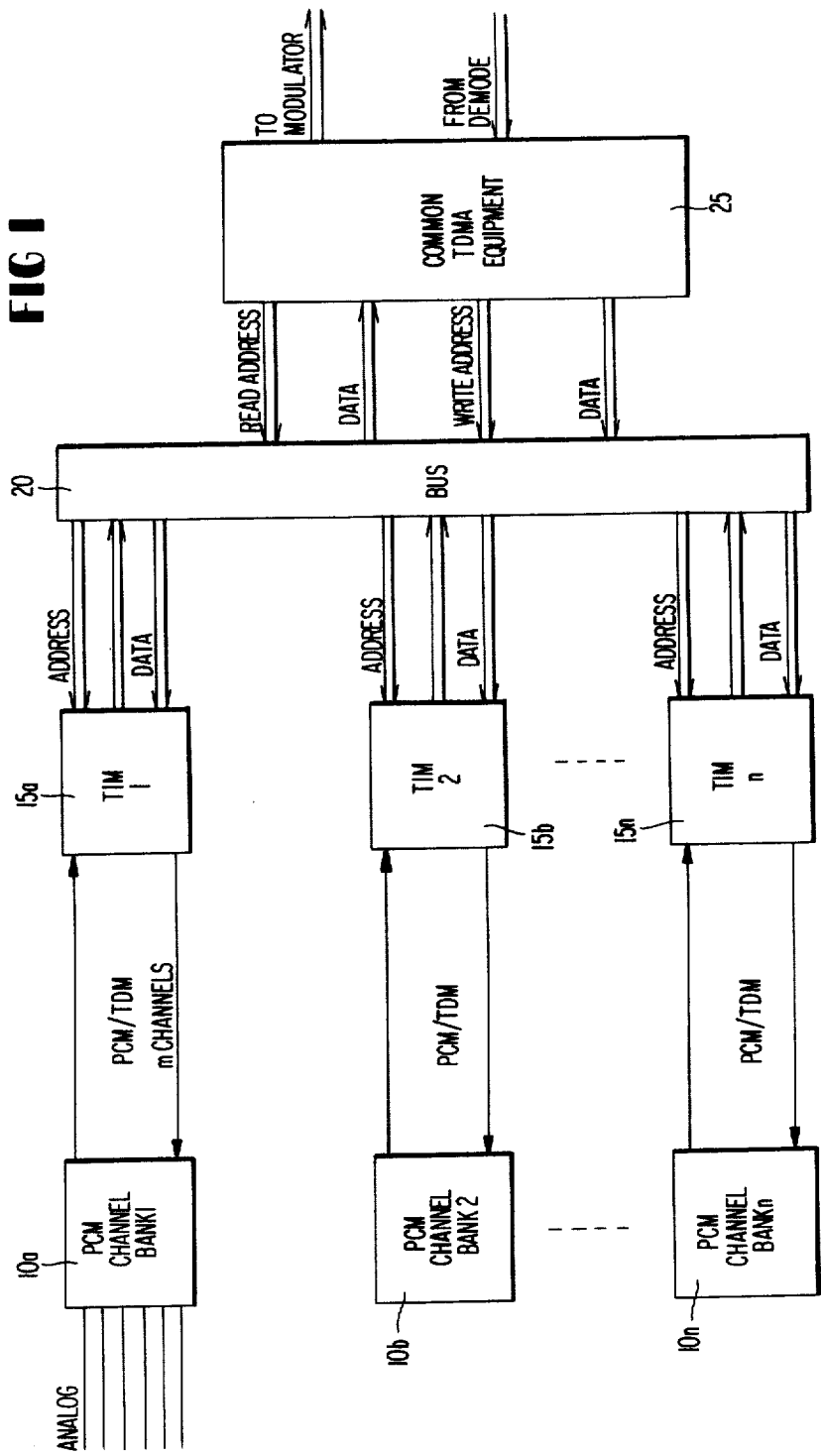
FIG. 1 is a schematic illustration of the relationship between a plurality of PCM channel banks, terrestrial interface modules, and the associated common TDMA equipment connected to the TIMs through a bus structure.

FIG. 1 is a schematic illustration of the relevant portion of the TDMA circuit in a single ground station with which the present invention is concerned. A plurality of analog channels which may be comprised of simple telephone lines for example are input to an associated 1 out of n PCM channel banks 10a through 10n. Each PCM channel bank converts the parallel analog input signals to pulse code modulated (PCM) time division multiplexed (TDM) serial bit streams which are applied to an associated 1 out of n terrestrial interface modules (TIM) 15a through 15n. Under the selective control of common TDMA (time division multiple access) equipment 25, the data from the appropriate TIM is delivered to bus 20 at the proper time where it is then delivered to the common TDMA equipment 25. The common TDMA equipment 25 processes the data so provided and delivers it to a modulator. The processing involved in the common TDMA equipment and subsequent modulation does not represent a part of the subject invention.

Data returning to the common TDMA equipment 25 from the demodulator is applied to the appropriate TIM module through bus 20 at the proper time. The appropriate TIM module is selected by the common equipment 25 by providing an address to all of the TIM modules simultaneously; the particular address so provided will cause the data to be written into only one of the TIM modules 15a through 15n. The data words provided to the TIM modules 15a through 15n are subsequently delivered to PCM channel banks 10a through 10n where they are demultiplexed and provided as a plurality of parallel analog signals from each of the channel banks.

Figure 2:
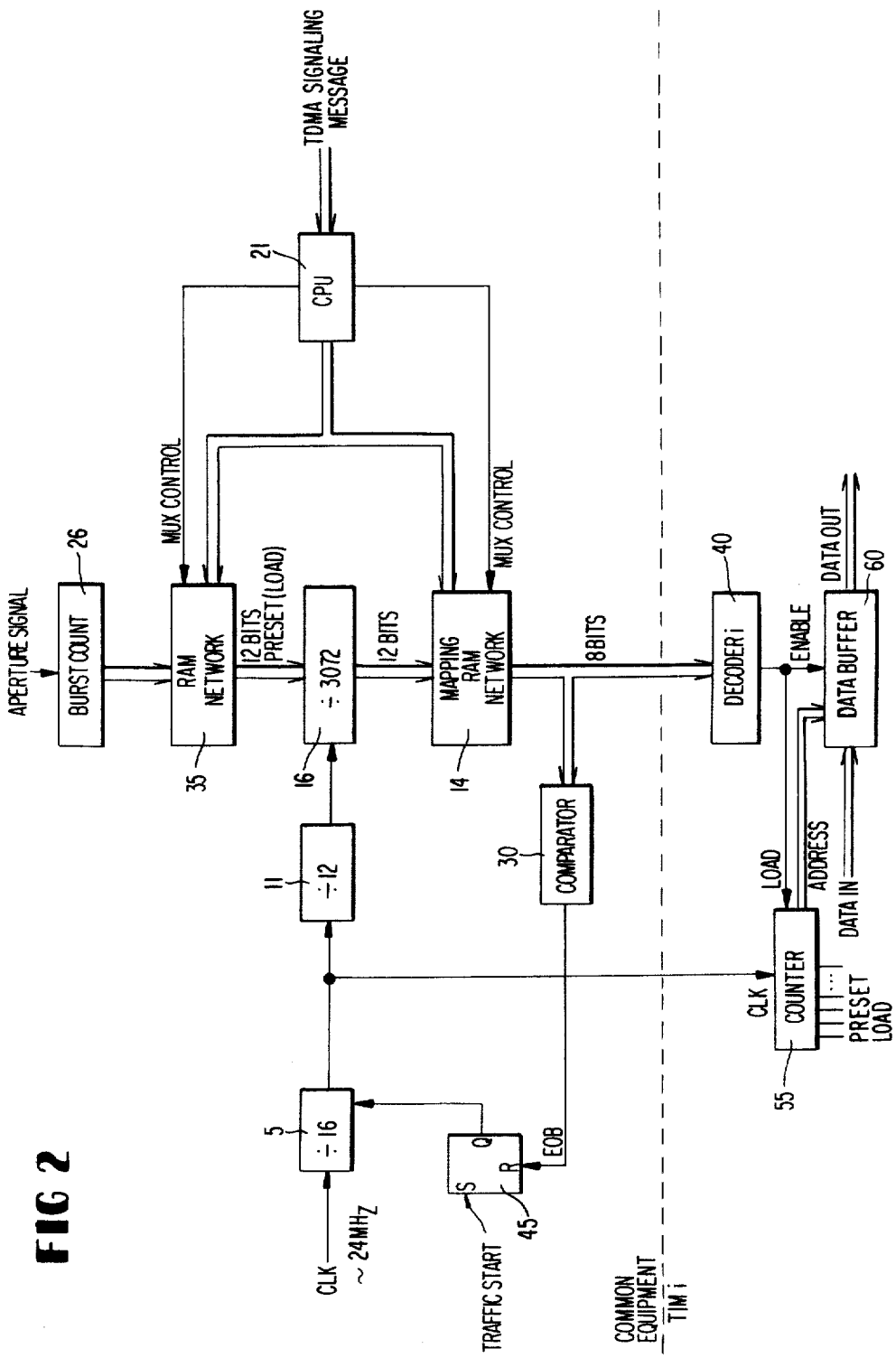
FIG. 2 is a schematic illustration of the details of the receive portion of common equipment and the associated receive portion of one of the terrestrial interface modules.

The invention is described in greater detail with reference to FIGS. 2 through 7. FIG. 2 illustrates the bus structure which provides a multiplex/demultiplex operation between a plurality of terrestrial interface modules (TIMs) and equipment common to each the TIMs. The apparatus shown in FIG. 2 is the receive side of the TDMA system. The transmit side of the TDMA system is exactly the same but for minor changes to be described below. A clock input of approximately 24 MHz is input to divide-by-16 counter 5. The output of counter 5 is applied to divide-by-12 counter 11 and to the clock input of counter 55. The output of counter 11 is applied to divide-by-3,072 counter 16 which is preset in accordance with CPU 21. The actual counter values depend upon system requirements such as the number of blocks per TDMA frame and are therefore a matter of choice.

Burst counter 26 keeps a constant count of the burst presently being processed by the common equipment. The aperture signal, which may be generated synchronously with each burst within the TDMA frame in any well-known manner, may alternatively be provided in accordance with the teachings of the co-pending, commonly assigned U.S. patent application Ser. No. 79,619 entitled "Microprogrammable TDMA Terminal Controller" by Joseph Deal, concurrently filed herewith. The burst counter 26 delivers the number of bursts to the RAM network 35.

Figure 3:
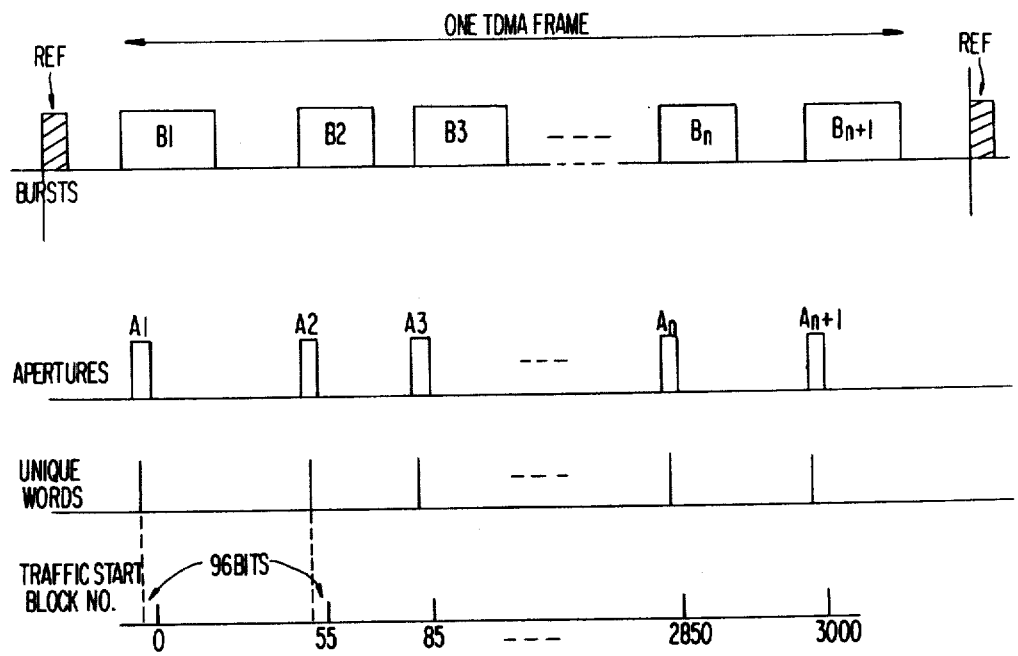
FIG. 3 is a timing chart illustrating the relationship between a TDMA frame, a plurality of bursts within the frame, the timing of aperture generation, unique words in block number allocation.

An entire TDMA frame is illustrated in FIG. 3. Each of the bursts $B_1$ through $B_{n+1}$ is received by the receive portion of common equipment. The unique word which supplies extremely fine synchronization information is extracted from each of the bursts in the common equipment by generating an aperture which is designed to surround the predicted occurrence in time of each unique word. With the unique word detection only performed during this aperture, the possibility of detecting false unique words is greatly reduced.

Figure 4:
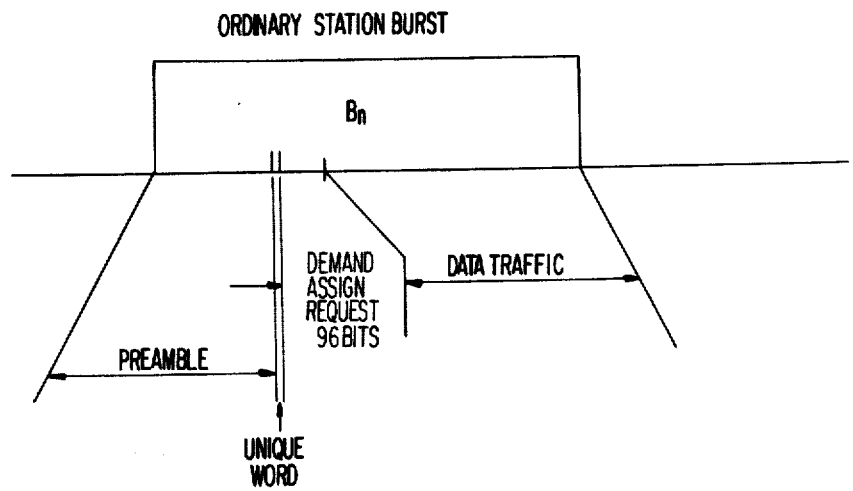
FIG. 4 illustrates in detail the composition of an ordinary station burst.

Referring to FIGS. 4 and 7, a 96 bit "demand assignment request" follows the unique words in each of the ordinary station bursts. Following this 96 bit request is the data traffic containing the PCM channel information. Any station other than the central network controller will ignore the demand assignment request upon receipt and handle only the data traffic for that particular burst. In FIG. 7 it can be seen that the aperture signal is combined with the unique word detection signal in one of AND gates 220. Unique dword detectors such as the one shown in FIG. 7 are well-known in the art and may distinguish between a regular unique word contained in the ordinary station burst and an inverted unique word contained in the reference station burst. The unique word detector 215 may alternatively be provided by the controller disclosed in U.S. Pat. Application Ser. No. 79,619.

Upon detection of the ordinary station unique word within the aperture, flip-flop 225 is set and enables counter 230 to count through the first 96 bits after the unique word. The bit rate clock input to counters 230 and 245 is supplied by the ground station modem. After reaching the 96th bit, the flip-flop 235 is enabled to provide the "traffic start" signal to the flip-flop 45 in the common equipment of FIG. 2.

The beginning of each "traffic start" signal defines a preselected position along a single TDMA frame. In the example illustrated in FIG. 3, burst $B_1$ has a traffic start signal defined at position or block No. 0 while the second burst has its start signal at block No. 55, and so on. In the example shown in FIG. 2, a maximum of 3,072 blocks are allowed within one TDMA frame. RAM 35 "knows" a priori the proper assigned position for each of the traffic start signals for each burst within the TDMA frame, and it need only keep track of which burst is presently being processed. If the burst counter 26 indicates to RAM 35 that the second burst is about to be processed, RAM 35 presets the block position "55" into divide by 3,072 counter 16 before counter 5 is enabled by flip-flop 45 to count the 24 MHz clock. In other words, when RAM 35 has address ". . . 0010" applied to its address lines from counter 26 (burst 2), it outputs a "55" (binary) in order to preset counter 16. The block counter 16 is preset in this manner since proper generation of the aperture signal is of higher probability than proper generation of the traffic signal (unique word); it is much likely that the unique word will not be detected as opposed as not detecting the aperture signal. If the block counter 16 were not preset, upon missing a unique word, counter 5 would not be enabled, the number contained in block counter 16 would be inaccurate, and the mapping RAM 14 would supply improper information to each of the TIMs for subsequent bursts.

RAM network 14 also knows a priori the number of data blocks contained in each burst and can therefore provide a signal to rest flip-flop 45 in order to disable counter 5 as soon as the entire burst has been accounted for. In this manner, the counter 16 will not erroneously count any more signals and provide an improper indication to RAM network 14. Upon recognizing that all of the blocks of data within any particular burst have been received, RAM 14 provides a pre-determined output (such as all 1's) to comparator 30. Comparator 30 recognizes the predetermined output and generates an end of burst (EOB) signal which resets flip-flop 45 to disable counter 5. Flip-flop 45 is set upon the next occurrence of a traffic start signal to enable counter 5.

Mapping RAM 14 is programmed to recognize a particular block of data presently being processed by the common equipment and to provide an output to all of the TIMs which indicates to the TIMs which, if any, should receive the current block of data. In a system of up to 256 TIMs for each common equipment section, the RAM 14 provides an 8 bit output to all of the TIM decoders 1–256. In other words, if counter 16 indicates that block "5" is being received and if block "5" must be delivered to TIM No. 8, the address input ". . . 0101" to RAM 14 produces an output ". . . 01000" to each of the decoders in the TIMs.

The decoder 40 located in each TIM receives the 8 bit input and provides a high or low signal in response thereto. Decoder 40 can be comprised of purely combinatorial discrete logic or can be a read only memory. For each block of data defined in counter 16, the decoder would provide an output which will either enable or disable the data buffer 60 so that data can selectively be written into the TIM. Data is written into the buffer 60 in accordance with the address provided by counter 55. The counter is loaded with a preset number upon a proper decoding and starts to count concurrently with the enable signal provided to the data buffer from decoder 40. The counter 55 is as large as necessary to provide for as many blocks of data as required in each TIM.

The transmit portion of the TDMA common equipment and the TIMs is the same as that shown in FIG. 2 except that RAM 35 and burst counter 25 need not be provided since any one ground station only transmits within one burst. The apparatus shown in FIG. 2 does, however, allow the ground station to produce a burst for each of a plurality of satellite transponders. In this case, the burst counter 25 is replaced with a transponder counter so that the RAMs 35 and 14 can keep track of the transponder to which they will transmit in real time.

CPU 21 is connected to RAM networks 35 and 14 in order to provide real time demand assignment control for every channel in each of the ground station networks. Reiterating, RAM network 35 functions to simply provide an output representing a block location for the beginning of data traffic for any particular burst in accordance with the address provided by burst counter 26. Mapping RAM 14 determines which block of data is currently being processed by receiving that information from counter 16 as a 12 bit address. In response to the block count provided at the RAM address, RAM 14 simply provides an 8 bit indication of which, if any, of the 256 TIMs is to receive the block of data. RAM 14 further functions to recognize the end of a burst based on its prior knowledge of the burst length and provide a preselected output to comparator 30 to disable any further counting. It can thus be seen that CPU 21, upon receiving new burst or block assignment information from a central control network, can provide new mapping functions to the RAMs 35 and 14 by simply reprogramming the RAMs to effect different burst and block assignments.

Figure 6:
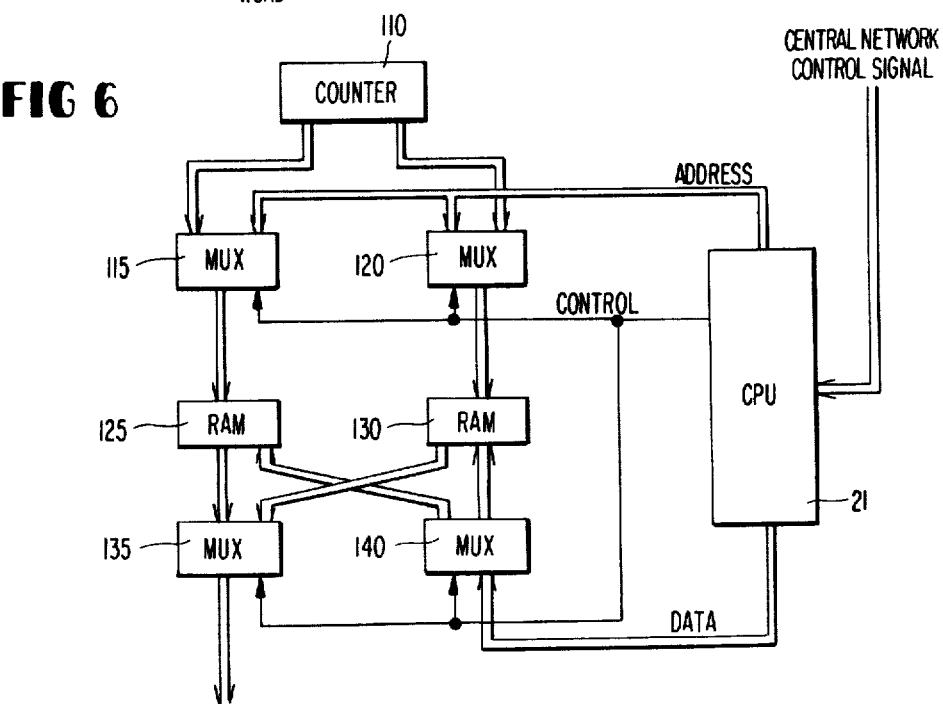
FIG. 6 is a schematic illustration of the "ping-pong" arrangement of the random access memory networks used in accordance with the present invention.
Figure 16:
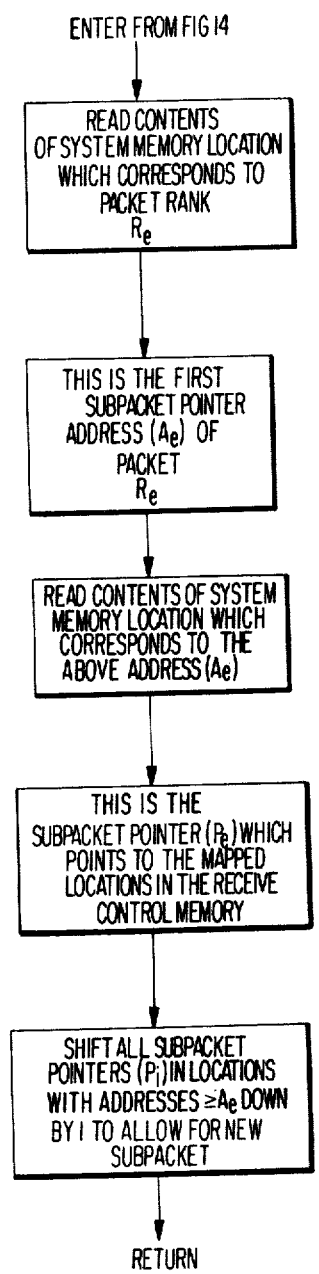
Figure 17:
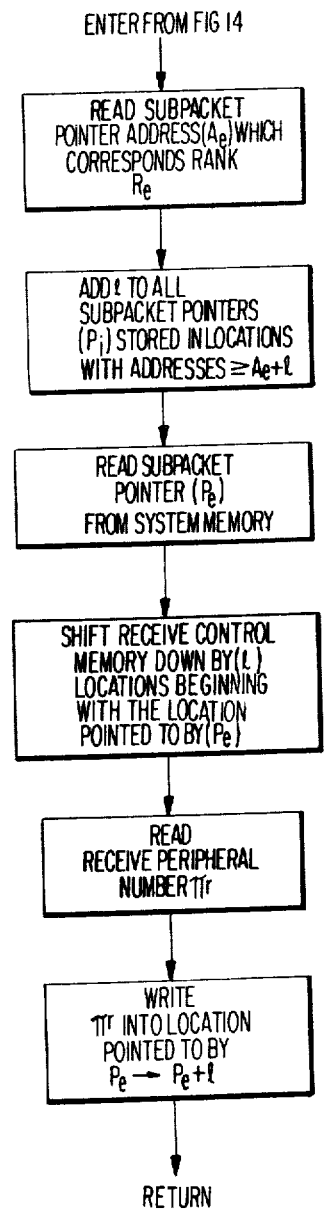

FIG. 6 illustrates the organization of each of RAM networks 35 and 14. Counter 110 represents either burst counter 25 or divide by 3,072 counter 16. The counter 110 provides the current count to one of RAMs 125 or 130 through multiplexers 115 or 120. The RAM 125 or 130 which receives the count from counter 110 is the RAM which is currently being used in real time by the common equipment to provide the mapping function. The output of one of RAMs 125 or 130 is delivered via multiplexer 135 to provide the output to either counter 16 or decoder 40. The RAM network can be updated in real time to effect a change in burst or block assignment by reprogramming the other of RAMs 125 or 130 by means of CPU 20 which provides an address line to multiplexers 115 and 120 and the line to multiplexer 140. The address data is provided to the other of RAMs 125 or 130 through multiplexers 115 or 120 respectively. The reprogrammed data from the CPU is provided to the other of RAMs 125 or 130 through multiplexer 140. The "ping pong" control of the RAMs 125 and 130 is effected through the multiplexers 115, 120, 135 and 140 under the control of CPU 21. Upon the reprogramming of the other of RAMs 125 or 130 the CPU will effect a change of control on the "super frame" boundary (approximately 10 TDMA frames). The timing of the ping pong action is however a matter of choice.

In several of the well known and currently used demand assignment request systems, each of the ground stations provides a single burst of data within the TDMA frame (FIG. 3). Each of the station bursts contains a demand assignment request as shown in FIG. 4. This request provides a central control network with information concerning channel usage at each station as well as requests from each station to either add or drop particular station channels. The central control network receives the demand assignment requests from each of the stations in the network in a well known manner and provides an updated channel allocation assignment in accordance with a particular demand assignment algorithm. Two such demand assigment algorithms which may be applied to the present system are currently being used and are known as the "Demand Assigned Switching and Signaling System" (DASS) and the "Marisat (Maritime Satellite) TDMA Telegraphy System". The demand assignment feature and central network control is further discussed in detail in the Fourth Annual International Conference on Digital Satellite Communications, Oct. 23-25, 1978, IEEE Catalogue No. 78CH1326-8 Reg. 7. Neither the central control network nor the algorithm employed therein represent a part of the present invention.

Figure 5:
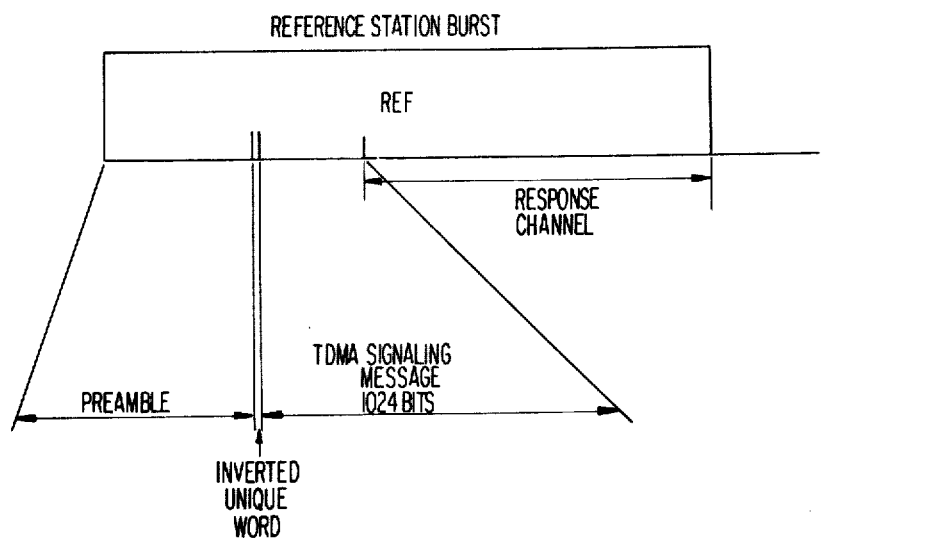
FIG. 5 is an illustration of the details of a reference station burst.

The central control network provides the reference station burst which brackets the TDMA frame as shown in FIG. 3. FIG. 5 illustrates the reference station burst in more detail. The reference burst is similar to the ordinary station burst in so far as it first provides a preamble, and a unique word. After the unique word is a "TDMA signaling message" which provides the reassignment information to each of the stations in the network. Referring to FIG. 7, the unique word detector 215 detects the presence of the reference station burst by noting the inverted state of the unique word and enables the associated one of AND gates 220 in order to set flip-flop 240. Flip-flop 240 provides a signal to counter 245 which initializes that counter and causes it to begin a counting procedure. Counter 245 counts to a maximum of 1024 corresponding to the 1024 bits in the TDMA signaling message. The output of counter 245 provides a write address to the RAM 255 through address multiplexer 250 which is controlled by the output of flip flop 240. The data bits from the reference burst are read into the RAM 255 at addresses designated by the counter 245. After providing the 1024 counts from counter 245, the flip flop 240 is reset and address multiplexer 250 provides the read address to the RAM 255 through address multiplexer 250. In this manner, the central network control signal, that is, the TDMA signaling data is delivered to the CPU 21.

The signal message decoding and demand assignment generation is performed by CPU 21 and will be explained with reference to FIGS. 8 through 34. FIGS. 8-10 illustrate the received control processor flow diagram. FIG. 11 is the flow diagram for determining the type of frame management message. Each group of eight signaling message bits is decoded to one bit of the frame management message or transmission instant message by a simple counting procedure. If $n \geq 3$, the bit is a "0", if $n \geq 5$, the bit is a "1", and if $n = 4$, a false detection message is relayed to the monitor and control processor (where n is the number of "1" bits in each octet) which will cause the common equipment to enter phase 1 of the startup procedure. The bit error rate is also calculated. As shown in Table 1, the BER has a direct relationship to the number of "1" bits counted. The BER is routed to the monitor and control processor (MCP) for transmission to the reference station.

TABLE 1

| Number of "1" Bits (n) vs Number of Errors | | | | | | | | |
|---|---|---|---|---|---|---|---|---|
| n | 0 | 1 | 2 | 3 | 4 | 5 | 6 | 7 | 8 |
| $n_e$ | 0 | 1 | 2 | 3 | 4 | 3 | 2 | 1 | 0 |

A parity check is performed on the decoded signaling message. If a parity error is found, the MCP is notified to enable it to direct the common equipment to enter phase 1 of the start-up procedure. The transmission instant message for any particular station, arrives at a superframe rate. Once per superframe this message is sent to the CPU for position correction of the packet transmission. The remainder of the data is the frame management message which is decoded and evaluated by the CPU. If necessary, the off-line RAMs will be updated. Packet frame position control data contained in the frame management message are transferred to the CPU. Every ordinary station common equipment must maintain receive information concerning system status in order to calculate from the TDMA signaling message new packet ranks, and subpacket rank positions within individual data packets. (The term "packet" is equivalent to "burst" as used above, the term "subpacket" is equivalent to "block" as used above, and the term "packet rank" refers to the number or position of a burst within a TDMA frame.) This is necessary because the TDMA signaling message is an update from the existing network configuration and thus calculation of the new system structure requires knowledge of the old structure.

The common equipment maintains system memory maps for calculating aperture arrivals and a receiver map for subpacket positions within data packets destined for local TIMs. These maps facilitate changing TIM subpacket addresses and aperture addresses in the respective mapping memories. Therefore, multiple algorithms are required to interpret the frames management message and configure terminal control units. FIG. 12 shows the system memory map.

The system memory map is organized in four sections. Section A is comprised of the system and working registers. Section B is the packet rank section, and it is assigned a specific block of system memory locations. The first subpacket pointer address for each packet is stored in a packet location in system memory (Section B) according to the packet rank. Section B is comprised of 256 sub-blocks, one for each possible network packet. This allows access to the first subpacket pointer for any packet by merely adding the packet rank to the address of the first packet location. Section C contains the subpacket pointer. The number of sub-blocks in section C is determined by the number of packet and subpackets which are active at any given time. The subpacket pointers designate the locations in the receive control memories which contain the TIM addresses for each subpacket. Using this system memory approach the common equipment keeps an updated record of the location of each subpacket TIM address, subpacket rank in the packet, and corresponding packet rank in the frame.

It is necessary when generating a new packet or subpacket to know the length of previously created packets and subpackets. These lengths are needed to allow the new TIM addresses, subpacket pointers and subpacket pointer addresses to be concatenated to memory in a consecutive manner. The length of packets is found by subtracting subpacket pointer addresses. In a similar manner subpacket lengths are calculated by subtraction of receive control memory addresses which are designated by the respective subpacket pointers. Flow charts for formating these maps are outlined at the end of this section.

The fourth section (D) of the system memory contains the aperture location map. The map contains the 256 possible aperture pointers. These aperture pointers designate the position in the aperture mapping memory of the frame position for each active aperture. FIG. 13 shows the aperture memory map.

When a data packet is generated, deleted or moved, the aperture memory must be updated. This is accomplished by using section D of the system memory to locate the new frame position in the aperture memory. This may require the shifting of other apertures. The system memory maps, section D, keep an updated record of where the apertures are located in the aperture memory and thus allows for fast relocation of th frame position.

The updating of the aperture memory is too slow to be accomplished in real time via the processor. The updating is done in an off-line RAM and switched in at the same time as the receive control memory. The flow charts of the algorithms of FIGS. 14-34 also contain the aperture generation procedure.

Figure 21:
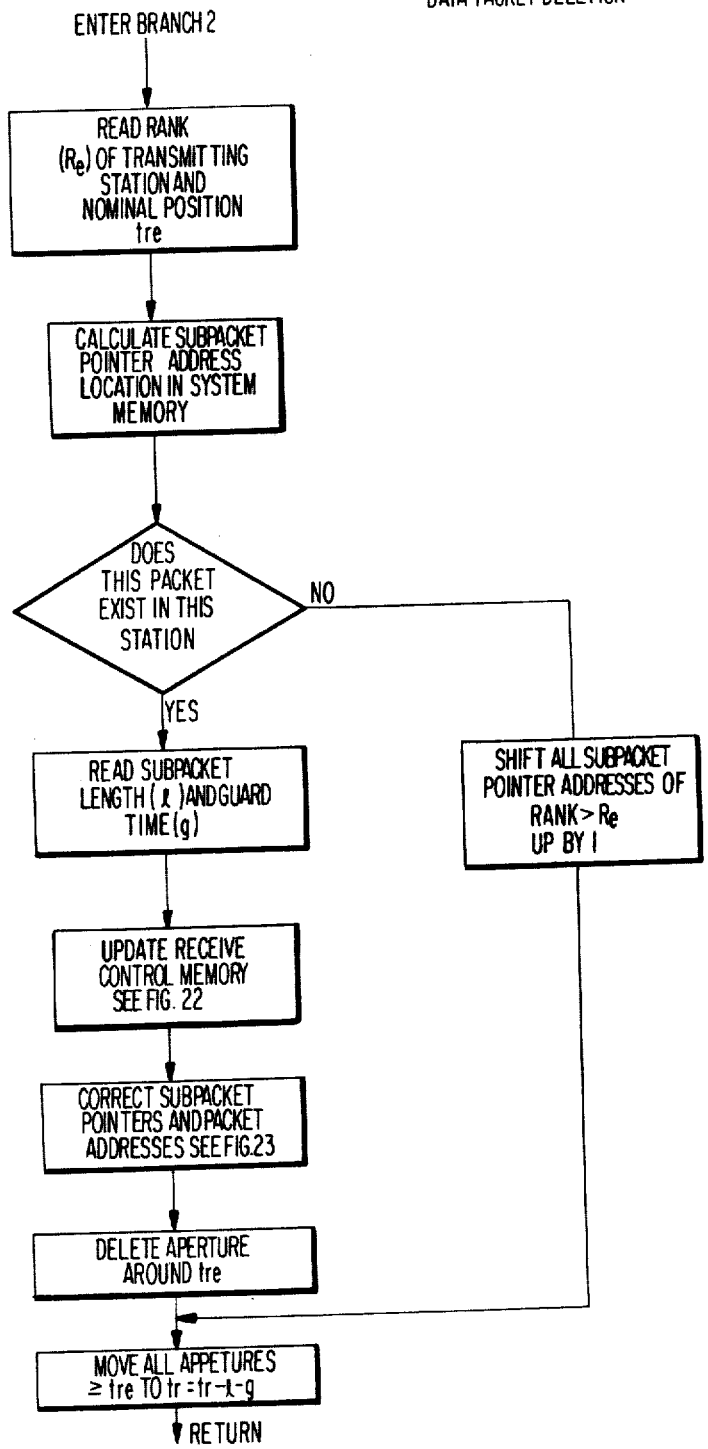
Figure 22:
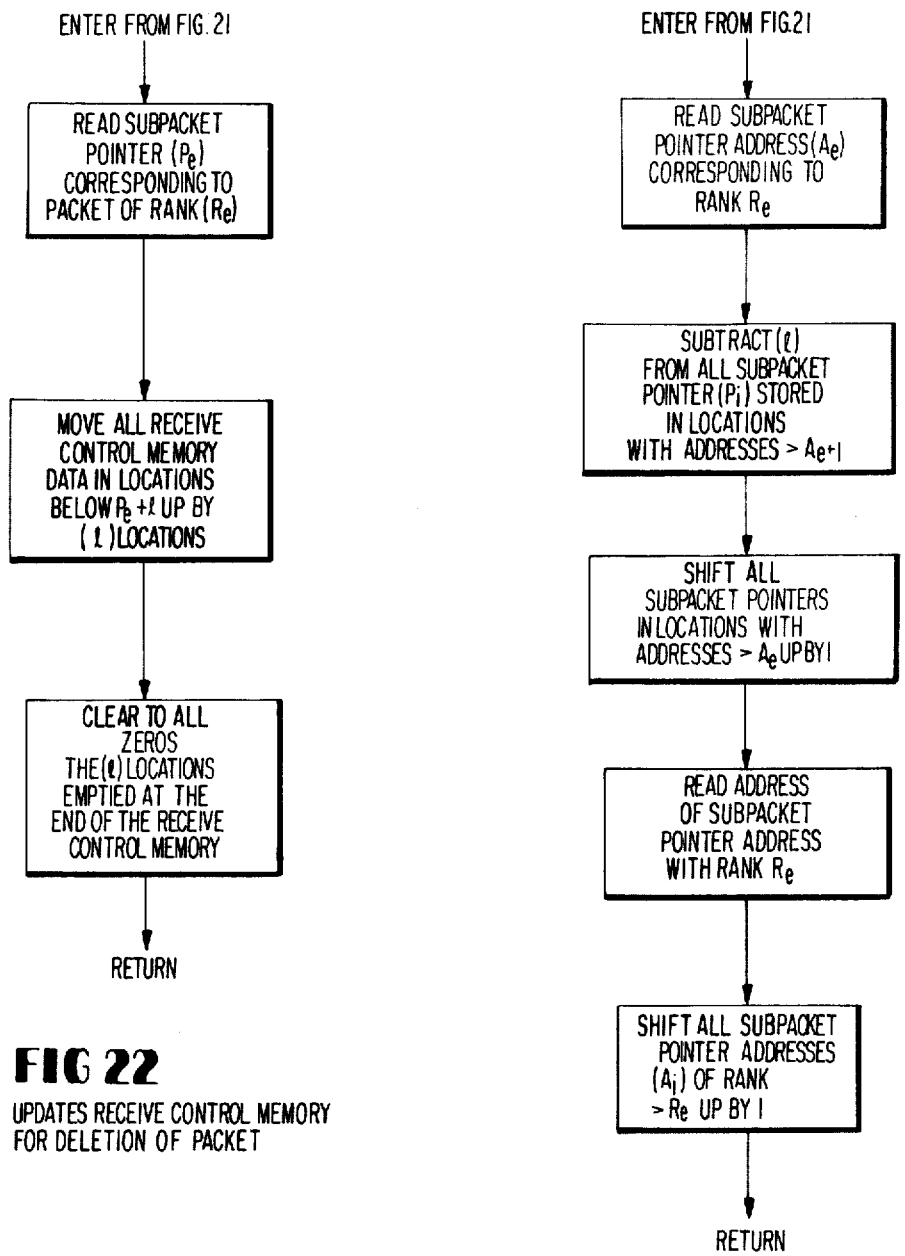
Figure 31:
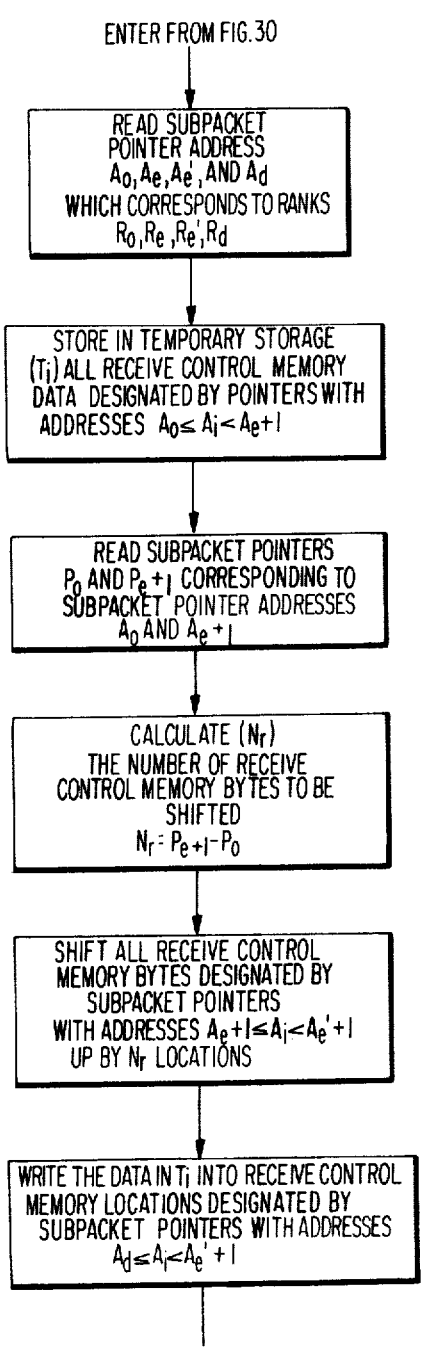
Figure 33:
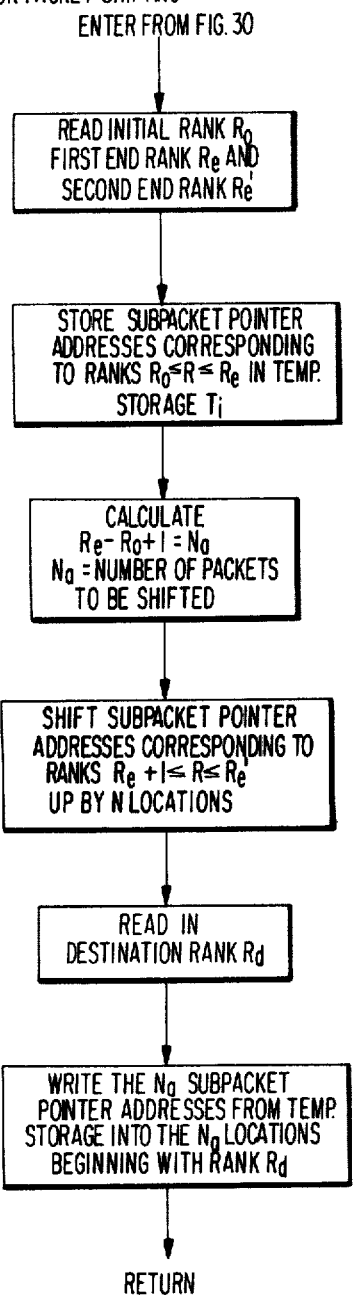
Figure 34:
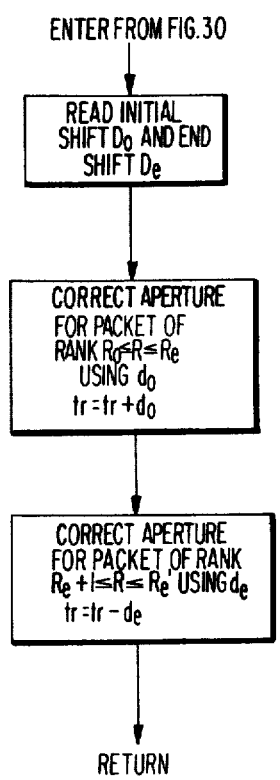

Flow charts of the algorithms needed to format the system map and the mapping memories are given in FIGS. 14-34. Each type of algorithm affects the memories in a slightly different manner. The primary operations performed are as follows:

a. data packet generation—FIGS. 14-20;
b. data packet deletion—FIGS. 21-23;
c. subpacket generation—FIGS. 24-26;
d. subpacket deletion—FIGS. 27-29; and
e. shifting of packets—FIGS. 30-34.

The present invention thus teaches a technique of providing a multiplex/demultiplex function which uses a plurality of mapping RAMs to effect a compact and flexible bus structure for interfacing a plurality of TIMs with common TDMA equipment. The mapping function of the RAMs will not be seriously effected by the loss of a synchronization signal (unique word) in as much as the RAMs keep track of data position and preset the data block count upon the occurrence of each new data burst.

The subject invention further provides a technique of performing a demand assignment routine in real time by simply "re-mapping" one or both of the mapping RAMs providing the mapping function.

Various changes, additions and omissions of elements may be made within the scope and spirit of this invention and it is to be understood that the invention is not limited to specific details, examples and preferred embodiments shown and described herein.

We claim:

1. In a demand assignment communications system having a plurality of stations, each of said stations transmitting a burst of data at a selected time, each burst having a plurality of channel portions, each station receiving selected channel portions of selected bursts of data, an apparatus for selecting said channel portions of said selected bursts of data comprising:

(a) means for counting said channel portions of data for providing a portion count output;
(b) means having an input/output function receiving said portion count output for providing a selection signal in accordance with said input/output function; said selection signal thereby selecting said selected channel portion;
(c) means for changing said input/output function so as to change the selected channel portion in accordance with said input/output changing means;
wherein said means having said input/output function comprises a pair of memory means; and said means for changing said input/output function comprises:
a central processing unit (CPU);
first and second multiplexers controlled by said CPU selectively providing an address from said CPU to one of said memory means, the other of said memory means receiving said portion count output;
a third multiplexer controlled by said CPU selectively delivering data from said CPU to said one of said memory means; and
a fourth multiplexer controlled by said CPU selectively delivering said selection signal from said other of said memory means, wherein said selected channel portion may be changed in real time.

2. In a data communications system having a plurality of stations, each of said stations transmitting a burst of data at a selected time, each burst having a plurality of channel portions, each station receiving selected channel portions of selected bursts of data, an apparatus for allocating said selected channel portions of selected bursts to said stations comprising:
(a) means for counting and tracking said bursts of data to provide an initialization signal;
(b) means receiving said initialization signal and a clock signal for counting said channel portions of data and for providing a portion count output;
(c) means receiving said portion count output for providing a selection signal;
(d) wherein said means for counting said channel portions is present in accordance with said initialization signal, said presetting occurring for each new burst of data.

3. The system claim 2, wherein said means for counting and tracking said bursts of data comprises a burst counter for counting the number of bursts received in a frame of bursts and memory means for providing a preset channel count in accordance with said burst counter.

4. The system of claim 3, wherein said means for counting said channel portions comprises a counter receiving a clock signal at the frequency of said channel portions and a preset input receiving said preset channel count, whereby said means for counting said channel portions is preset in accordance with said preset channel count and counts from said preset channel count at said frequency of said channel portions to thereby keep track of the number of said channel portions received in said frame of bursts.

5. The system of claim 4, wherein said burst counter is responsive to a relatively high reliability, low precision signal and said clock signal is responsive to a relatively low reliability, high precision signal synchronous with said relatively high reliability, low precision signal, whereby the temporary loss of said clock signal will not affect the reliability of said portion count output for succeeding bursts.

6. The system of claim 2, 3, 4 or 5, wherein said means for providing said selection signal comprises memory means having an input/output function to thereby transform said portion count output into said selection signal.

7. The system of claim 6, further comprising central processing means, and wherein said means for providing said selection signal comprises random access memory means, the contents of which may be changed in response to said central processing means to thereby change said input/output function.

8. The system of claim 6, wherein each of said stations comprise a plurality of interfaces, said system further comprising means for allocating selected channel portions to individual interfaces, said means for allocating comprising:
decoder means receiving said selection signal and for providing an enable signal;
a data buffer for receiving data under the control of said enable signal; and
address counter means enabled by said enable signal for providing an address to said data buffer.

* * * * *